(12) United States Patent
Smith et al.

(10) Patent No.: US 6,367,244 B1
(45) Date of Patent: Apr. 9, 2002

(54) PROPULSION SYSTEM CONTAINING A MIXED-PHASE PROPELLANT AND A METHOD FOR PROPELLING AN OBJECT WITH THE SAME

(75) Inventors: Kevin W. Smith, Coral Gables; Theodore C. Slack, Jr., Miami; Korey R. Kline; Thomas O. Bales, Jr., both of Coral Gables, all of FL (US)

(73) Assignee: Hy Pat Corporation, Miami, FL (US)

( * ) Notice: Subject to any disclaimer, the term of this patent is extended or adjusted under 35 U.S.C. 154(b) by 938 days.

(21) Appl. No.: 08/853,883

(22) Filed: May 9, 1997

(51) Int. Cl.$^7$ ................................................. F02K 9/28
(52) U.S. Cl. ........................................ 60/251; 60/219
(58) Field of Search .......................... 60/251, 219, 220, 60/211, 205, 204

(56) References Cited

U.S. PATENT DOCUMENTS

| | | | |
|---|---|---|---|
| 2,984,973 A | 5/1961 | Stegelman | |
| 3,068,641 A | 12/1962 | Fox | |
| 3,083,526 A | 4/1963 | Hudson | |
| 3,115,007 A | * 12/1963 | Fox | 60/251 |
| 3,555,826 A | * 1/1971 | Bennett, Jr. | 60/251 |
| 3,613,583 A | * 10/1971 | Lai et al. | 60/251 |
| 3,662,555 A | * 5/1972 | Ayers et al. | 60/219 |
| 3,664,132 A | * 5/1972 | Vessel et al. | 60/219 |
| 3,709,652 A | * 1/1973 | Iwanciow et al. | 60/251 |
| 3,742,710 A | * 7/1973 | Trowbridge | 60/219 |
| 3,782,112 A | 1/1974 | Muzzy | |
| 3,792,669 A | * 2/1974 | Ueno et al. | 60/204 |
| 4,420,931 A | * 12/1983 | Anderson | 60/219 |
| 5,010,730 A | 4/1991 | Knuth et al. | |
| 5,099,645 A | 3/1992 | Schuler et al. | |
| 5,572,864 A | * 11/1996 | Jones | 60/251 |
| 5,582,001 A | * 12/1996 | Bradford et al. | 60/251 |
| 5,715,675 A | * 2/1998 | Smith et al. | 60/251 |
| 5,722,232 A | * 3/1998 | Jones | 60/251 |
| 5,765,361 A | * 6/1998 | Jones et al. | 60/251 |

OTHER PUBLICATIONS

Goldberg, "Hybrids: Best of both worlds", Aerospace America, Jun. 1991, pp. 28–31.

* cited by examiner

Primary Examiner—Harold J. Tudor
(74) Attorney, Agent, or Firm—David P Gordon; David S Jacobson; Thomas A Gallagher (57) ABSTRACT

A propulsion system with at least one storage chamber containing at least one solid propellant and at least one fluid propellant is disclosed. The fluid propellant is retained under pressurized conditions, such that depressurization of the storage chamber substantially homogeneously disperses the at least one solid propellant in the at least one fluid propellant. A mixed-phase propellant can thereby be fed to a combustion chamber. The pressurized conditions under which the at least one fluid propellant is retained can include supercritical or critical conditions, saturation conditions, and conditions sufficient to provide a compressed gas.

28 Claims, 10 Drawing Sheets

PROPULSION SYSTEM CONTAINING A MIXED-PHASE PROPELLANT AND A METHOD FOR PROPELLING AN OBJECT WITH THE SAME

BACKGROUND OF THE INVENTION

1. Field of Invention

The present invention relates generally to a propulsion system containing a mixed-phase oxidizer and/or a mixed phase fuel propellant, and to a method for propelling an object containing such propulsion system. The propulsion system and method of the present invention are particularly adaptable for use with rockets.

2. Description of Related Art

Bipropellant propulsion systems are well known in the art and generally contain an oxidizer stored separately from a reactive fuel propellant. In monopropellant propulsion systems, the oxidizer and fuel propellants are stored in combination.

Hybrid propellant systems, a species of bipropellant propulsion systems, have been gaining more acceptance and attention. A hybrid propellant system typically contains of a fluid oxidizer retained in an oxidizer storage chamber, a solid fuel grain such as a molded cylinder of hydroxyl-terminated polybutadiene rubber or polyethylene polymer retained in a pressure vessel, a mixing chamber, an injector for introducing the fluid oxidizer into the solid fuel grain, and a nozzle which in operation discharges exhaust gases so as to provide forward thrust to the system. Some of the more well-known advantages associated with hybrid propulsion systems include the complete separability of the fuel from the principal oxidizer, thus inhibiting the potential for inadvertent ignition or catastrophic failure; the flexibility in selecting and optimizing the combination of propellant ingredients regardless of whether they are solid or liquid; and the ability to easily start, stop, and restart the propulsion system. Reverse hybrid propellant systems, which typically contain a liquid fuel propellant retained in a storage chamber and a solid oxidizer retained in a separate pressure vessel chamber, theoretically provide similar advantages to a hybrid system. To date, however, reverse hybrid rocket motors have not been well developed, owing to difficulties associated with development of a solid oxidizer structure possessing satisfactory thermo-mechanical properties, such as strength, durability, and ablation-rate control.

In addition to the above-mentioned safety and flexibility concerns, in designing a propulsion system attention must also be given to the performability and efficiency of the oxidizer and fuel propellants employed in the system. In particular, the capability of the oxidizer and fuel propellants to enhance the following two measurable properties is especially pertinent in the selection of the propellants:

(1) the specific impulse of the system, which is defined as the thrust in pounds force developed by a specific system, multiplied by the duration in seconds of the thrust, divided by the weight in pounds of the fuel and oxidizer; and (2) the density specific impulse of the system, which is defined as the specific impulse multiplied by the specific gravity of the fuel-oxidizer combination.

One manner of optimizing these properties in a given propulsion system is to increase the density of the oxidizer and fuel propellants. By increasing the density of these propellants, a corresponding decrease in the size of the oxidizer and fuel tanks that must be propelled through the atmosphere is realized. Consequently, the attendant aerodynamic drag of the propulsion system is abated.

Conventional liquid-phase oxidizers usually are constituted by a single chemical species, such as, by way of example, liquid oxygen, liquified nitrous oxide, red fuming nitric acid, nitrogen tetroxide, liquified fluorine, or hydrogen peroxide. In addition, gases, such as gaseous oxygen or fluorine, and mixtures of liquid and gas oxidizers, such as fluorine-liquid oxygen, have occasionally been employed. However, each of these liquid and liquid/gas oxidizers have been plagued by such deficiencies as: poor specific impulse and density specific impulse; a short storageability; high toxicity, especially in the cases of nitric acid, nitrogen tetroxide, and fluorine; instability, especially in the case of hydrogen peroxide; and any combination thereof.

In an attempt to develop a higher performance oxidizer suitable for introduction into a combustion chamber by fluid flow, the present inventors envisioned combining solid-phase oxidizers and additives with liquid oxidizers. However, fluid-solid (i.e., mixed-phase) oxidizers initially were considered unsuitable for a propulsion system, given the tendency of the propellants of the mixture to separate during storage, resulting in a stratified liquid-solid, gas-solid, or gas-liquid-solid charge in the oxidizer storage chamber.

In order to prevent the solid and fluid phases from separating in storage, it was proposed to divide the solid-phase propellant into sufficiently fine particulates which would behave in a colloidal manner when mixed with the fluid phase. Colloidal mixtures, sometimes referred to as emulsions or gels, have been known to maintain their suspension of solid particles indefinitely. However, the provision of colloidal mixtures in the propulsion system would be accompanied by several adverse consequences. For example, some oxidizer materials, such as ammonium nitrate and ammonium perchlorate, would be difficult to reduce to colloidal size due to their hygroscopic nature. Also, highly-energetic oxidizers such as nitronium perchlorate, ammonium dinitramide, glycidyl azide polymer, xenon hexafluoride, and ammonium perchlorate could be very hazardous to handle when finely divided, given their considerable surface area-to-volume ratio. The amount of energy needed to set off a decomposition or deflagration reaction would be reduced to hazardously low levels where such fine powders can be employed.

It was hypothesized that the surface energy of the particulate material could be controlled by addition of suitable surfactants such as sodium laurylsulfate, sucrose monolaurate, or dextrose to prevent agglomeration, which would de-stabilize the colloidal suspension. However, such surfactants would be unsuitable for use in highly oxidizing environments, since the surfactants, and in particular dextrose, might chemically react with the oxidizing substances.

Finally, phase changes of the suspending medium could lead to disruptions of the suspension while in storage. Such phase changes can include temperature cycling, freezing, and phase changes from saturated liquid/gas to supersaturated fluid. The effects of such phase changes can include vibration of the suspension and potential plugging of valves and piping.

SUMMARY OF THE INVENTION

The present invention solves the aforementioned problems associated with the related art as well as other problems by providing a propulsion system in which the advantages of stable oxidizers such as nitrous oxide and conventional fuels can be retained while increasing the specific impulse and density specific impulse of the system containing these propellants.

In accordance with an embodiment of the present invention, the inherent disadvantages of fluid oxidizers are overcome by the provision of a bipropellant system suitable for retaining both fluid-phase and solid-phase oxidizer propellants while avoiding the aforementioned problems associated with stratification of the two oxidizer phases. The fluid-phase and solid-phase oxidizers can be retained in their separated state, but under carefully controlled pressurized conditions, in a tank or vessel, such as an oxidizer storage chamber (also referred to herein as the first chamber).

The pressurized fluid in the oxidizer storage chamber is preferably retained under supercritical conditions, or as a compressed gas or saturated liquid. Sudden negative adjustments in pressure, which can be effected by opening the chamber to communicate with a combustion chamber (or a communicating means interconnecting the oxidizer storage and combustion chambers) having a pressure differential with respect to the oxidizer storage chamber, can result in sudden phase transitions or volumetric changes. When suddenly depressurized, a solid-phase particulate oxidizer rapidly mixes into and is suspended in the fluid phase oxidizer, thereby providing a mixed-phase oxidizer. As referred to herein, "mixed-phase" shall include a solid-liquid, solid-gaseous, or solid-liquid-gaseous mixture. The pressure drop is preferably so great that, at least after an initial discharged portion (which tends to contain a high concentration of particulates), the mixed-phase oxidizer is substantially homogeneously insofar as the fluid-phase oxidizer discharged from the storage tank contains a substantially uniform distribution of solid particles therein. As long as this mixing continues, and for a certain time thereafter, the solid oxidizer particulates remain in suspension, uniformly distributed throughout the fluid oxidizer in the oxidizer storage chamber. This phenomenon is referred to herein as a mixed-phase suspension process.

The present invention also provides a monopropellant fuel propulsion system in which a solid-phase fuel propellant or energetic propellant is retained with a fluid oxidizer under pressurized conditions, and a monopropellant fuel propulsion system in which a solid-phase oxidizer is retained with a fluid fuel under pressurized conditions.

The present invention further relates to a bipropellant fuel propulsion system, including a reverse-hybrid system, in which a solid-phase fuel propellant or energetic propellant is retained with a fluid-phase fuel under pressurized conditions.

In addition, the present invention also is directed to methods of propelling an object in accordance with the mixed-phase suspension process of the present invention.

These and other objects, features, and advantages of the present invention will become apparent from the following detailed description when taken in conjunction with the accompanying drawings which illustrate, by way of example, the principles of the present invention.

BRIEF DESCRIPTION OF THE DRAWINGS

The accompanying drawings illustrate the present invention. In such drawings.

DESCRIPTION OF THE PREFERRED EMBODIMENTS

A detailed description of preferred embodiments of the present invention is provided below.

Figure 1A:
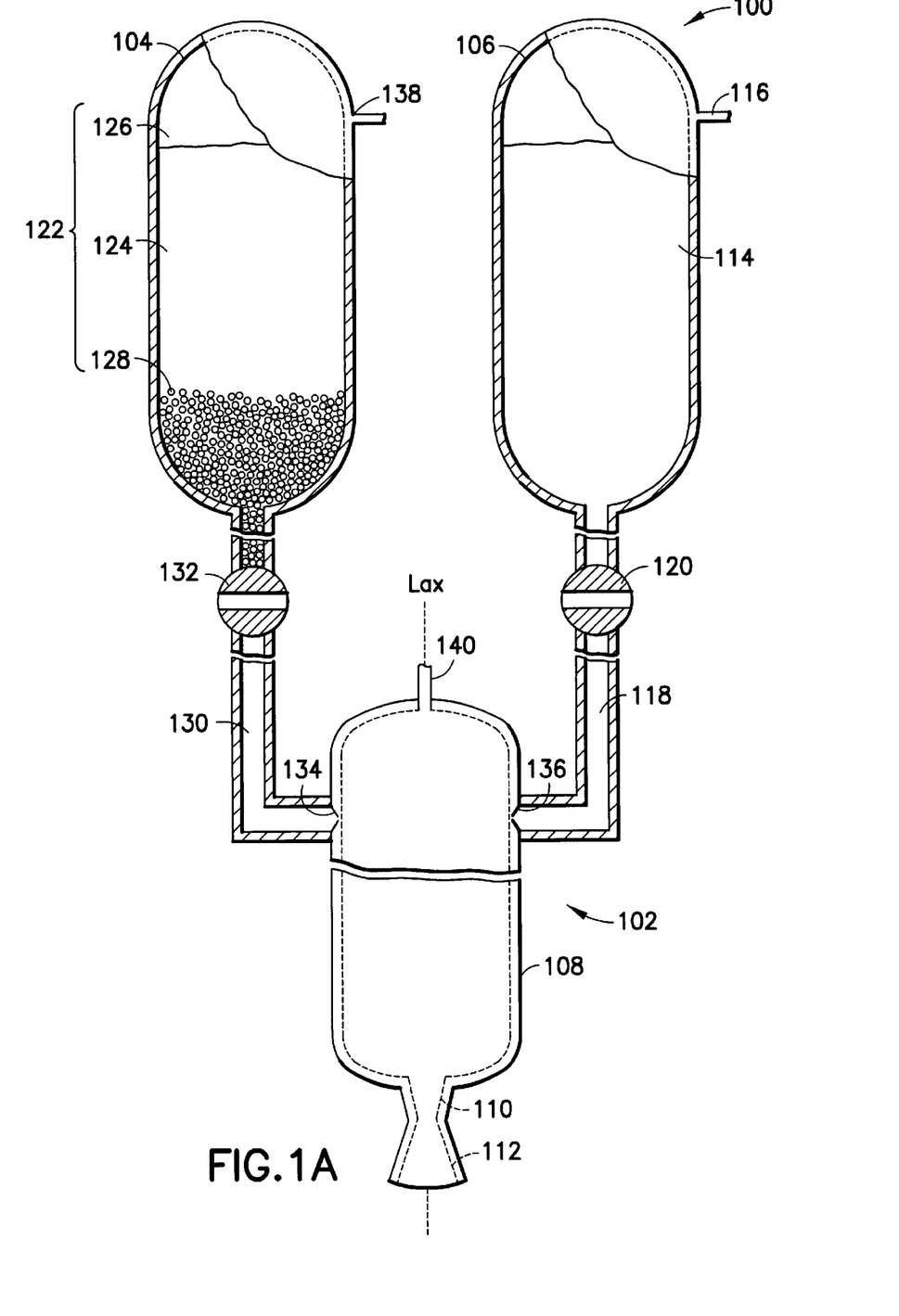
FIG. 1A is a schematic view, including a partial cut away sectional view, representing the bipropellant propulsion system containing solid-phase and saturated liquid-phase oxidizers under static conditions in accordance with a first embodiment of the present invention.

In order to fully appreciate the present invention, a brief description is provided of the general structure and design of a bipropellant rocket propulsion system, as generally designated by reference numeral 100 in FIG. 1A. The system 100 is designed to be installed within a launch vehicle or object (not shown), such as a rocket. The system 100 includes an integrated propulsion unit 102 connected at its upper, or forward, end to a lower, or aft, end of an oxidizer storage chamber 104 (also referred to herein as a first chamber) and a fuel storage chamber 106 (also referred to herein as a second chamber). It is understood that these storage chambers can also be constituted by a temporary holding tank or similar vessel that can be suitably pressurized to retain the propellant for a definite period of time.

By way of example, the integrated propulsion unit 102 can have a longitudinal axis $L_{ax}$ containing an interior, substantially cylindrical combustion chamber 108 concentrically contained within the integrated propulsion unit 102. A pyrophoric ignition injector (or pyrophoric material introduction device) 140 is provided in communication with the combustion chamber 108. A thrust nozzle 110, having a rearwardly diverging exhaust port 112, is located at the aft end of the integrated propulsion unit 102 to exhaust gases and produce thrust to the system. Although not shown in FIG. 1A, provision can be made for supplying coolants to or providing insulation about the combustion chamber 108. A more detailed description of a hybrid propulsion unit suitable for application with the present invention can be found in U.S. patent application Ser. No. 08/383,522, now U.S. Pat. No. 5,715,675, the complete disclosure of which is incorporated herein by reference.

As illustrated in FIG. 1A, a liquid fuel component 114 is supplied from the fuel chamber 106, which can be pressurized by a gas supply source 116. The fuel storage chamber 106 communicates with the combustion chamber 108 via a fuel component communicating passage 118. The flow of the fuel component 114 can be regulated by conventional valving 120, which is depicted in FIG. 1A in a closed position, and a conventional valving controlling system (not shown).

The fuel valve 120 and oxidizer valve 132 may be standard corrosion-resistant ball valves suitable in size and materials for the desired rocket performance and reactant materials. For example, in a typical small bipropellant system, the valves may be one-inch stainless steel alloy 316 ball valves operated by electrical motors and gear-reduction devices to allow the valves to be opened and closed for firing and shut-down by a propulsion control computer. In the case of a ground-based static test firing, the valves 120 and 132 may be operated manually or by pneumatic actuators.

The oxidizer storage chamber 104 is depicted in FIG. 1A in a storage, or "static", state and contains a multi-component saturated oxidizer 122 comprising a saturated liquid oxidizer 124, such as nitrous oxide, at saturation pressure (Psat) and thus in equilibrium with its vapor 126, and a solid-phase particulate oxidizer 128, such as ammonium nitrate. Saturation pressures Psat of various oxidizers are readily known in the art. Illustrative saturated liquid oxidizers 124 and examples of their respective saturation pressures are listed below in TABLE I. It is understood, however, that the present invention is in no way limited to these illustrative oxidizers.

TABLE I

| Oxidizer | Temp. | $P_{Sat}$ (psig) |
| --- | --- | --- |
| Nitrous Oxide | 50° F. | 575 |
| (N$_2$O) | 60° F. | 660 |
| | 70° F. | 760 |
| | 80° F. | 865 |

TABLE I-continued

| Oxidizer | Temp. | $P_{Sat}$ (psig) |
| --- | --- | --- |
| Nitrogen | 100° F. | 15 |
| Tetroxide | 150° F. | 75 |
| (N$_2$O$_4$) | 200° F. | 220 |
| | 250° F. | 540 |
| Chlorine | 40° C. | 30 |
| Trifluoride | 50° C. | 45 |
| (ClF$_3$) | 60° C. | 66 |
| | 70° C. | 90 |
| Fluorine | −155° C. | 220 |
| (F$_2$) | −150° C. | 310 |
| | −145° C. | 400 |
| | −140° C. | 500 |
| Chlorine | 140° C. | 720 |
| Pentafluoride | 130° C. | 620 |
| (ClF$_5$) | 120° C. | 520 |

The particulate oxidizer 128 tends to separate from the liquid oxidizer 124 when stored and will drift towards the bottom portion of the oxidizer storage chamber 104. Generally, the multi-component saturated oxidizer 122 should have a volumetric concentration of particulate oxidizer of no more than about 80% in order to ensure sufficient mixing and flowability of the oxidizer 124 through an oxidizer communicating passage 130 that connects the oxidizer storage chamber 104 with the combustion chamber 108. This volumetric concentration varies in accordance with the particular liquid oxidizer selected.

The flow of the oxidizer 122 to the combustion chamber 108 can be regulated by the oxidizer valve 132, which is depicted in FIG. 1A in a closed position. The oxidizer storage chamber 104 and fuel storage chamber 106 are connected to the combustion chamber 108 with an oxidizer injector 134 and fuel injector 136, respectively. The injectors 134 and 136 serve to introduce the oxidizer 122 and liquid fuel component 114 into the combustion chamber 108 in an atomized spray or impinging jet streams while maintaining the appropriate pressure-drop conditions between, on the one hand the combustion chamber 108, and on the other hand the oxidizer feed line 130 and fuel feed line 118 for proper operation of the bipropellant propulsion system. Design of the injectors 134 and 136 is particularly important insofar as the injectors must prevent (or contribute to the prevention of) mass flow or thermal transfer "upstream" from the combustion chamber to the feed lines, valving, and storage tanks, since such transfer could result in a destructive explosion of the storage, injector, or feed-line systems. The configurations and dimensions of the injectors 134 and 136 typically depend upon the particular design of the rocket engine; development of the injectors is within the understanding and ability of the skilled artisan.

Figure 1B:
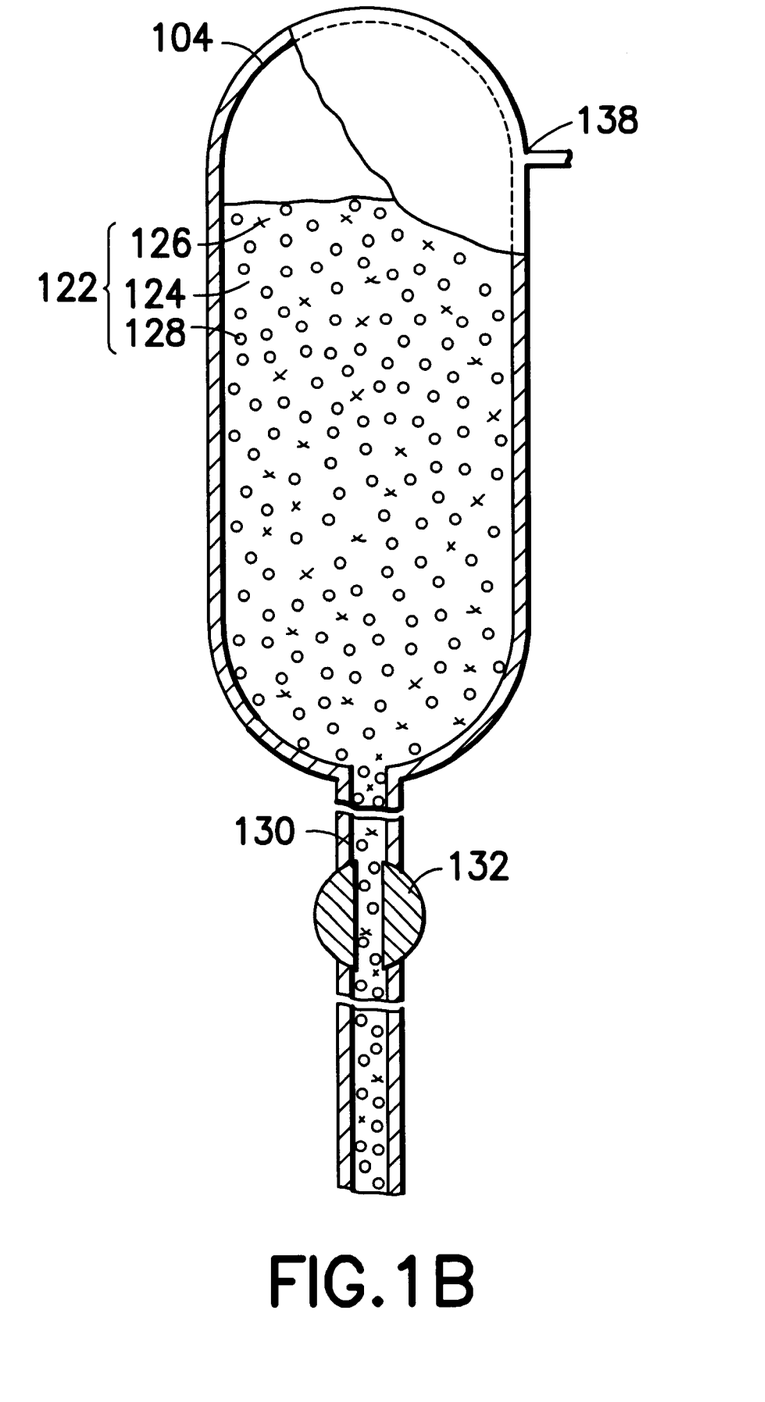
FIG. 1B depicts a schematic view, including a partial cut away sectional view, of the system of FIG. 1A containing a mixed-phase oxidizer, as illustrated immediately after the chamber containing the oxidizer is at least partially depressurized by being opened to communication with a combustion chamber.

In operation, the liquid fuel component 114 and oxidizer 122 are introduced to the combustion chamber 108 by opening the valves 120 and 132, respectively. Opening the valve 132 effects a sudden negative change in pressure in the oxidizer storage chamber 104 due to the pressure differential between the first chamber 104 and the combustion chamber 108 (or communicating passage 130). The pressure in the first chamber 104 drops below Psat, thereby causing the saturated liquid oxidizer 124 to rapidly undergo a phase change resulting in a boiling liquid-gas condition, which causes the solid-phase particulate oxidizer 128 to rapidly mix in the boiling fluids. Consequently, the solid particulates 128 become suspended in and are substantially homogeneously mixed with the liquid oxidizer 124, as illustrated in FIG. 1B.

Exemplary fluid oxidizers suitable for application in the present invention include nitrous oxide, which at normal ambient temperatures can be compressed to form a saturated liquid/gas equilibrium in the range of 600–800 pounds per square inch pressure at a suitable temperature (see TABLE I). The gas condenses to form a higher-density liquid phase in equilibrium with a lower-density vapor at a temperature-pressure condition referred to as a saturated liquid-vapor system.

Exemplary solid-phase oxidizers 128 that can be retained with and suspended in liquid oxidizers such as nitrous oxide include ammonium nitrate, ammonium perchlorate, nitronium perchlorate, lithium perchlorate, sodium perchlorate, sodium peroxide, iodine, xenon hexafluoride, and combinations thereof.

The inclusion of these and similar solid-phase oxidizers significantly improves the density specific impulse of the system, while retaining the advantages of storability and throttleability. For example, a hybrid rocket motor employing a liquid oxidizer of nitrous oxide, but no solid-phase oxidizer, and hydroxyl-terminated polybutadiene (HTPB) as the fuel component has a theoretical maximum specific impulse (referenced to vacuum conditions) of about 261 seconds, and a theoretical density specific impulse under typical conditions of about 176 sec·g/cc. On the other hand, by employing an oxidizer containing 80% by volume of ammonium perchlorate suspended in nitrous oxide and a HTPB fuel component, the theoretical specific impulse of the system is about 253 seconds, and the theoretical density specific impulse is dramatically increased, and virtually doubled, to about 349 sec·g/cc. In practical systems, the realized specific impulse and density specific impulse would be increased by comparable ratios. Similarly, for an oxidizer containing 80% by volume of ammonium nitrate suspended in nitrous oxide, the theoretical specific impulse is about 235 seconds and the theoretical density specific impulse is again dramatically increased to about 309 sec·g/cc. For an oxidizer containing 80% by volume of nitronium perchlorate suspended in nitrous oxide, the theoretical specific impulse and theoretical density specific impulse are about 271 seconds and about 371 sec·g/cc, respectively, again demonstrating a uniquely great increase in the density specific impulse. Of course, other oxidizers such as nitrates, perchlorates, peroxides, or halogen-containing compounds also are suitable.

Figure 2A:
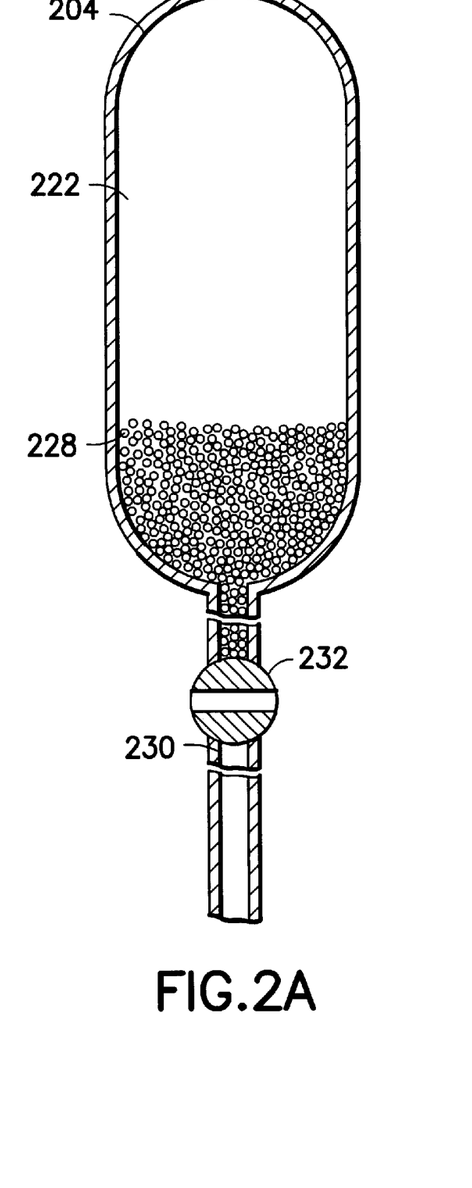
FIGS. 2A and 2B show schematic sectional views of an oxidizer storage chamber containing both solid-phase and supercritical fluid-phase oxidizers in a static state, and a mixed-phase oxidizer produced therefrom subsequent to at least partial depressurization of the oxidizer storage chamber, respectively, the supercritical storage conditions being adaptable for the system illustrated in FIG. 1A.
Figure 2B:
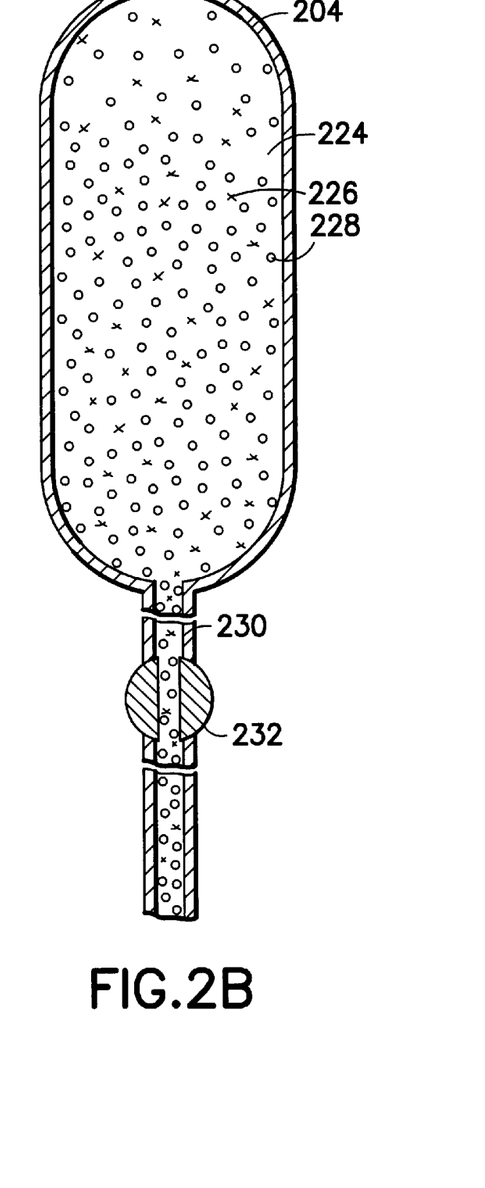

FIGS. 2A and 2B show an oxidizer storage chamber 204 suitable for application in the system 100 of FIG. 1A. As shown in FIG. 2A, in its static state the chamber 204 includes a solid-phase particulate oxidizer 228 and an oxidizer fluid 222, such as nitrous oxide, retained under critical or supercritical conditions. That is, the oxidizer fluid 222 is supercritical insofar as there is no discrete liquid-vapor phase boundary above the "critical temperature" and/or "critical pressure". The resulting supercritical fluid has characteristics of both gas and liquid—a density near that of a liquid, yet compressibility characteristics of a gas.

Critical pressures and temperatures of various oxidizers are readily known in the art. Illustrative oxidizer fluids 222 and examples of their respective critical pressures and temperatures are listed below in TABLE II. It is understood, however, that the present invention is in no way limited to these illustrative oxidizers.

TABLE II

| Oxidizer | $T_{crit}$ (° C.) | $P_{crit}$ (atm) |
| --- | --- | --- |
| Nitrous Oxide ($N_2O$) | 36 | 70 |
| Nitrogen Tetroxide ($N_2O_4$) | 158 | 98 |
| Chlorine Trifluoride ($ClF_3$) | 174 | 57 |
| Fluorine ($F_2$) | −129 | 55 |
| Chlorine Pentafluoride ($ClF_5$) | 143 | 52 |
| Oxygen | −118 | 50 |

For example, supercritical nitrous oxide at a temperature of 100° F. and 72 atm can be employed.

In operation, immediately after the valve 232 is opened, as depicted in FIG. 2B, a sudden negative change in pressure is produced in the oxidizer storage chamber 204 due to the pressure differential between the first chamber 204 and the combustion chamber or communicating passage (not shown in FIGS. 2A and 2B). The conditions in the oxidizer storage chamber 204 fall to sub-critical, thereby causing the fluid oxidizer 222 to separate into vapor and liquid phases 226 and 224, respectively, and to rapidly inter-mix with the solid-phase particulate oxidizer 228. Consequently, the finely-divided solid particulates 228 are temporarily suspended in and substantially homogeneously mixed with the liquid oxidizer 224, as illustrated in FIG. 2B. The mixed oxidizer can then flow through the oxidizer valve 232 to the combustion chamber (not shown in FIGS. 2A and 2B).

Figure 3A:
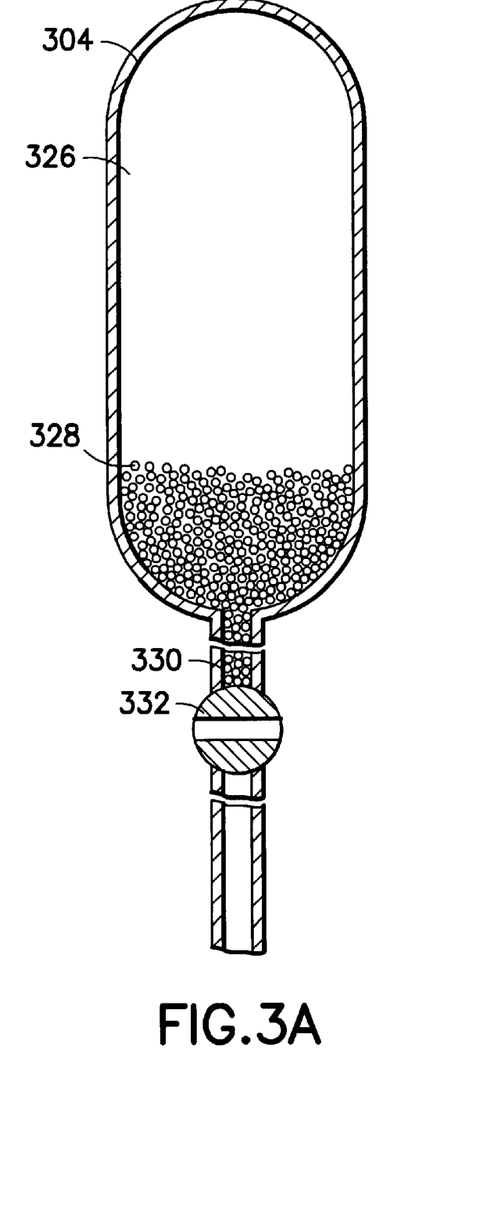
FIGS. 3A and 3B show schematic sectional views of an oxidizer storage chamber containing both solid-phase and compressed gaseous oxidizers in a static state, and a mixed-phase oxidizer produced therefrom subsequent to at least partial depressurization of the oxidizer storage chamber, respectively, the compressed gas storage conditions being adaptable for the system illustrated in FIG. 1A.
Figure 3B:
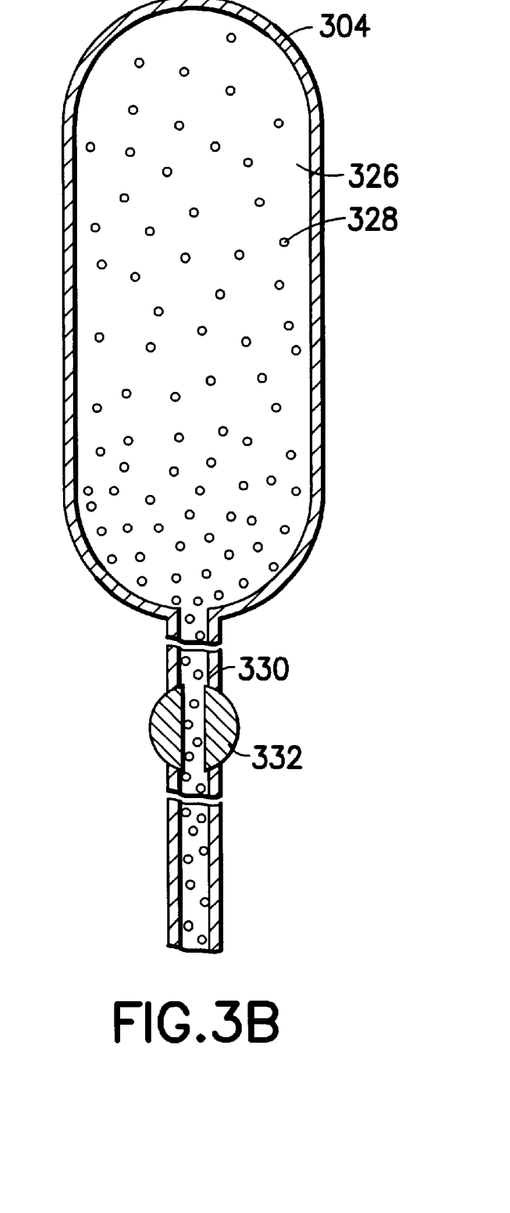

FIGS. 3A and 3B show an oxidizer storage chamber 304 suitable for application in the system 100 of FIG. 1A. As shown in FIG. 3A, the chamber 304 includes a solid-phase particulate oxidizer 328 and an oxidizer gas 326 under compressed conditions (Pzero), which tend to separate into stratified layers under static state conditions.

Suitable compressed oxidizer gases 326 include, by way of example and without limitation, oxygen gas at 2000 psig and ambient temperature and fluorine at 1500 psig and ambient temperature. At these temperatures and pressures, both oxygen and fluorine gases are supercritical; however, since ambient temperature is substantially above the respective critical temperatures of both gases at these pressures, both gases behave as nearly ideal gases under the above-stated conditions.

In operation, opening of the oxidizer valve 332 effects a sudden negative change in pressure in the oxidizer storage chamber 304 due to the pressure differential between the first chamber 304 and the combustion chamber (not shown in FIGS. 3A and 3B) or the portion (unnumbered) of the communicating passage 330 downstream from the valve 332. The pressure change in the oxidizer chamber 304 induces the oxidizer gas 326 to expand from its compressed state and flow between interstitial spaces within the solid oxidizer particulates 328. Even though the oxidizer gas 326 does not condense or become supercritical in the embodiment depicted in FIGS. 3A and 3B, sufficient volumetric change is effected in the gaseous oxidizer 326 during depressurization such that the bed of solid particles 326 is lifted and mixed ("fluidized" or "levitated"), thereby producing the mixed-phase oxidizer, as depicted in FIG. 3B. The mixed-phase oxidizer then flows through the open oxidizer valve 332 as in FIG. 3B to the combustion chamber (not shown in FIGS. 3A and 3B).

In addition to the above-mentioned more conventional oxidizers, such as nitrates and perchlorates, "energetic oxidizer" materials, such as ammonium dinitramide, can be introduced into the fluid oxidizer (as an alternative to or in combination with the simple oxidizers) to improve the performance of the propulsion system. The addition of these energetic oxidizers is particularly advantageous in a storable hybrid-fueled rocket motor for portable or tactical applications, since the oxidizers suitable for such systems (such as hydrogen peroxide or nitrous oxide) usually exhibit low performance levels. For example, a hybrid rocket engine using HTPB fuel and an oxidizer mixture of 80% by volume of ammonium dinitramide suspended in nitrous oxide provides a theoretical specific impulse of about 264 seconds and theoretical density specific impulse of about 349 sec·g/cc.

While the foregoing discussion mostly specifies the use of nitrous oxide as a fluid oxidizer, other saturated fluid, pressurized-gas, or supercritical-fluid oxidizers also are suitable for application in the present invention. For example, cryogenic liquid oxygen is suitable. Although liquid oxygen is conventionally stored at a sufficiently low temperature such that the oxygen remains a liquid at low pressures, in accordance with the present invention the liquid oxygen is retained under pressure and temperature conditions, such as supercritical (55 atm., 158K) or saturated liquid (40 atm., 149K) conditions, to generate mixed-phase suspension process effect of the present invention. In this manner, solid oxidizer materials can be combined with pure liquid oxygen to achieve the advantages of higher specific impulse and density specific impulse noted above. Other gases or mixtures of gases which liquify, become supercritical, or are highly compressed under storage conditions could be used in a similar manner, such as fluorine, chlorine, fluorine-oxygen, fluorine-chlorine, or chlorine-oxygen.

Figure 4A:
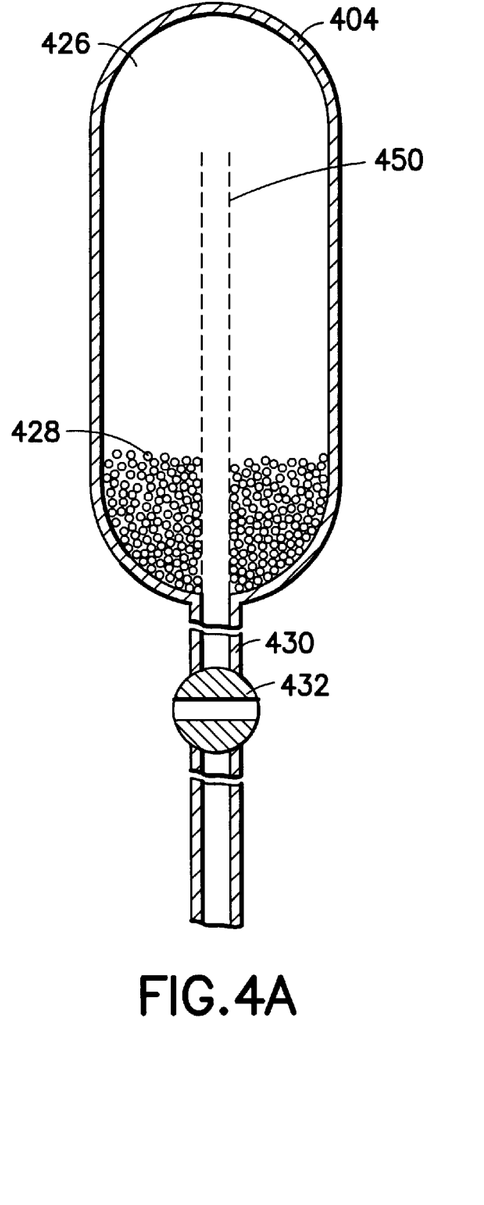
FIGS. 4A and 4B depict schematic sectional views of an alternative embodiment of an oxidizer storage chamber in a static state, and the conditions in the chamber subsequent to at least partial depressurization, respectively.
Figure 4B:
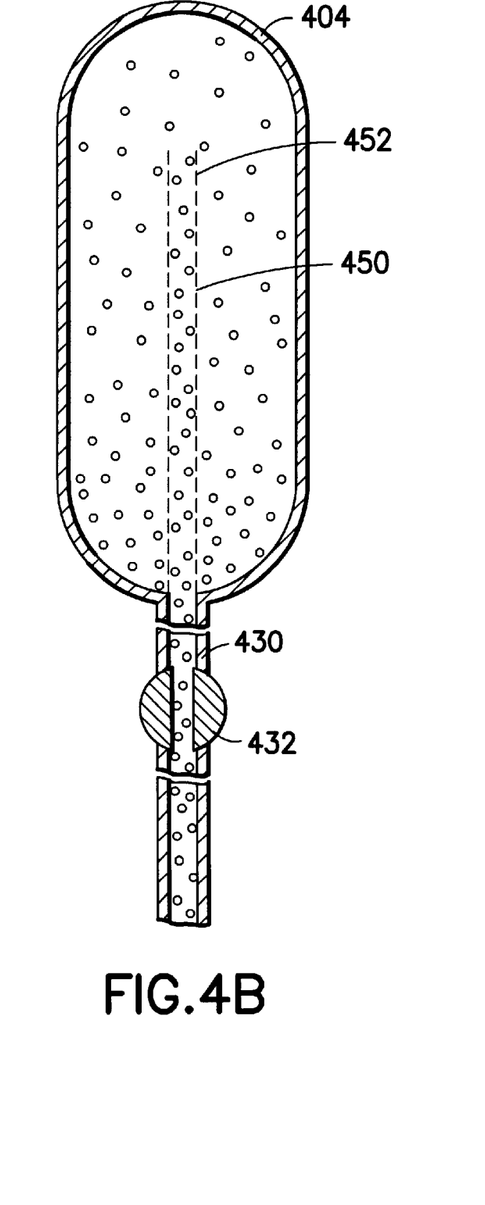

FIGS. 4A and 4B illustrate an improvement to the oxidizer storage chamber suitable for application in any of the foregoing oxidizer storage chambers, as well as the oxidizer and fuel storage chambers discussed below. According to this improvement, a perforated standpipe 450 is disposed inside of an oxidizer storage chamber 404 (or optionally in a fuel storage chamber or a monopropellant system storage chamber) and connected to communicating passage 430, which contains an oxidizer valve 432. As shown in FIG. 4A, in its static state the chamber 404 includes a solid-phase particulate oxidizer 428 and a compressed oxidizer gas 426. It is understood, however, that a chamber containing a saturated liquid oxidizer or critical or supercritical-fluid oxidizer can be employed in the alternative.

As in the operation of the above-discussed embodiments, opening of the oxidizer valve 432, as shown in FIG. 4B, depressurizes the oxidizer storage chamber 404 and causes the oxidizer gas 426 to undergo a sufficient volumetric change to thereby lift and mix the solid particles 426, thereby placing them into suspension. Although the solid-phase particulates are substantially homogeneously mixed with the oxidizer gas 426 (or fluid), the initial portion of oxidizer discharged from the chamber 404 may contain a higher portion of solid-phase oxidizer 428 than desired, since the solid-phase oxidizer 428 may be more concentrated at a bottom portion of the chamber 404.

The perforated standpipe 450, positioned within the chamber 404, provides a plurality of oxidizer exit ports 452 located at various heights and/or locations in that chamber 404. For example, for a tank with a standpipe having a 0.50 inch diameter and a 0.02 thickness and array of approximately 100 holes, the holes being uniformly distributed and spaced over the length of the standpipe and the holes each having a 0.06 diameter, would virtually assure that both fluid and particulate oxidizers would be substantially uniformly drawn from all regions of the tank during depressurization and expulsion. The holes should be of sufficient size and configuration to avoid obstruction, such that the holes are not substantially smaller than the thickness of the standpipe. The total effective area of the collection of holes should be comparable to or greater than the surface area of the standpipe.

In operation, the portion of oxidizer at the bottom of the oxidizer storage chamber 404, where the fraction of solid-phase particles 428 to fluid oxidizer is highest in the static state, is not the only mixture initially discharged from the oxidizer chamber 404 after opening of the oxidizer valve 432. Rather, fractions of the mixed-phase oxidizer from portions throughout the chamber 404 containing lower concentrations of solid particulates are mixed with the solids-rich fractions, initially located at the bottom portion of the chamber 404. As a result, a more uniform distribution of solid-phase particulate oxidizer 428 flows with the oxidizer fluid 426 through the standpipe 450 and into the combustion chamber (not shown in FIG. 4) during evacuation of the chamber 404.

The design and placement of the exit ports 452 along the standpipe 450 to obtain a uniform distribution of solid-phase particulates 428 in the discharged oxidizer is within the understanding of one skilled in the art and would not require an undue degree of experimentation. For example, if, in a given configuration, the initial outflow of oxidizer is found to be excessive in solid-phase oxidizer, the distribution of holes in the standpipe may be biased so that there are relatively more holes toward the top of the standpipe. Conversely, if the initial outflow of oxidizer were found to be deficient in solid-phase oxidizer, the holes could be biased toward the bottom of the standpipe.

Figure 5A:
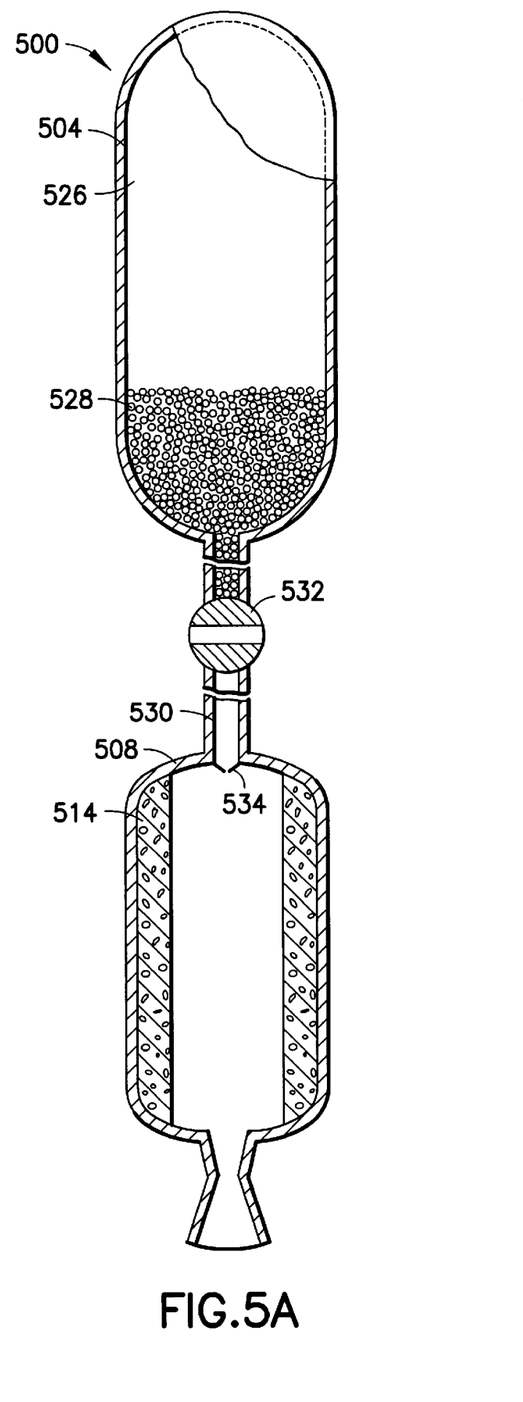
FIGS. 5A and 5B depict schematic views, including partial cut away sectional views, of a hybrid propellant system including a solid-phase fuel propellant retained in a compression chamber and an oxidizer storage chamber containing both solid-phase and compressed gaseous oxidizers in a static state, and a mixed-phase oxidizer produced therefrom subsequent to at least partial depressurization of the oxidizer storage chamber, respectively.
Figure 5B:
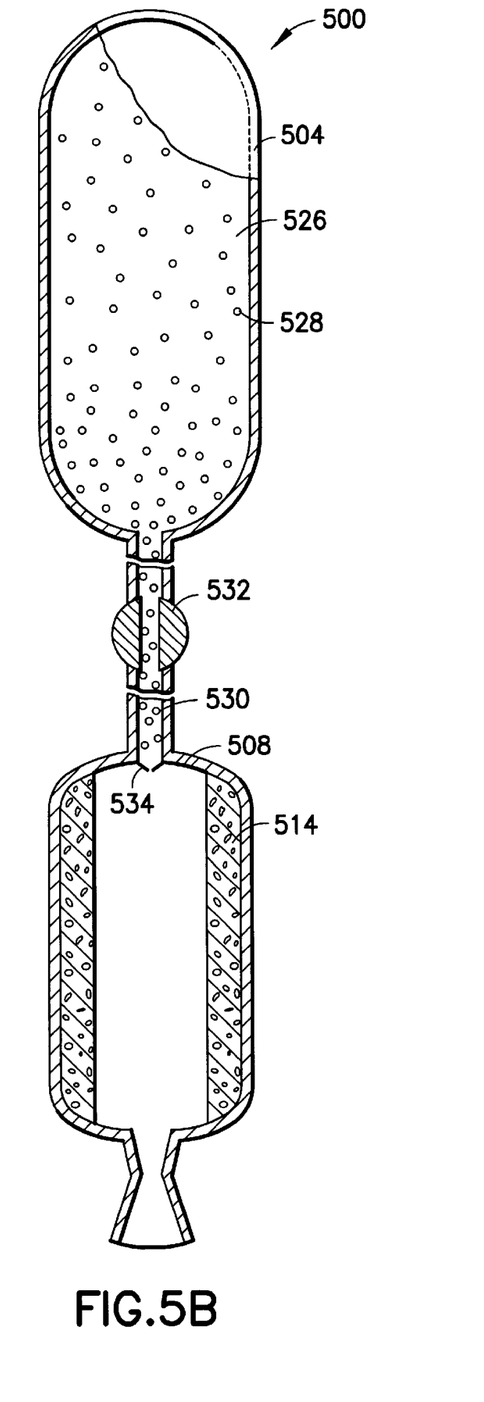

FIGS. 5A and 5B show a hybrid rocket propulsion system, generally indicated by reference numeral 500, which can be employed as an alternative to, or optionally in combination with, the propulsion system 102 shown in FIG. 1A. The hybrid fuel rocket propulsion system 500 includes a solid fuel reactant 514 retained in a combustion chamber 508, which is in turn fitted with a thrust nozzle 510 having a rearwardly diverging exhaust port 512 to exhaust gases so as to produce thrust to the system 500.

As illustrated in FIG. 5A, the chamber 504 includes a solid-phase particulate oxidizer 528 and a compressed oxidizer gas 526 which tend to separate from each other when the system is in a static state. It is understood, however, that the chamber 504 can contain a saturated liquid oxidizer or an oxidizer fluid under critical or supercritical conditions, as previously described, as an alternative to the compressed oxidizer gas 526. The oxidizer storage chamber 504 is connected to the combustion chamber 508 via a communicating passage 530 containing conventional valving 532. An injector 534 forms and directs the flow of oxidizer into the combustion chamber 508.

Referring to FIG. 5B, in operation, opening the oxidizer valve 532 depressurizes the oxidizer storage chamber 504 and causes the mixed-phase suspension process to proceed, as previously described. The mixed-phase oxidizer is thereafter transferred into the combustion chamber 508 containing the solid fuel component 514, where the reaction therebetween ensues.

Figure 6A:
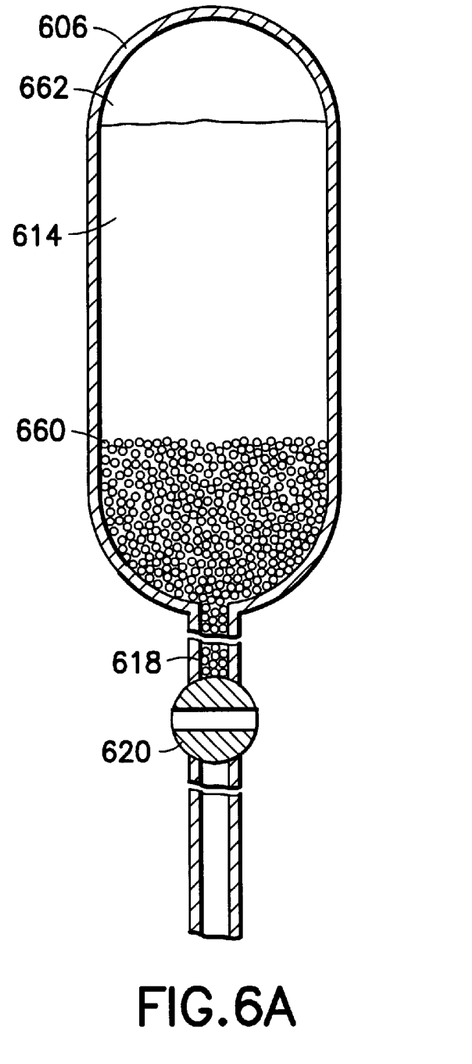
FIGS. 6A and 6B illustrate schematic sectional views of a fuel storage chamber containing both solid-phase and saturated fluid-phase fuel propellants in a static state, and a mixed-phase fuel propellant obtained therefrom subsequent to at least partial depressurization of the fuel storage chamber, respectively, the saturated storage conditions being adaptable for the bipropellant propulsion system FIG. 1A or a reverse-hybrid propellant system.
Figure 6B:
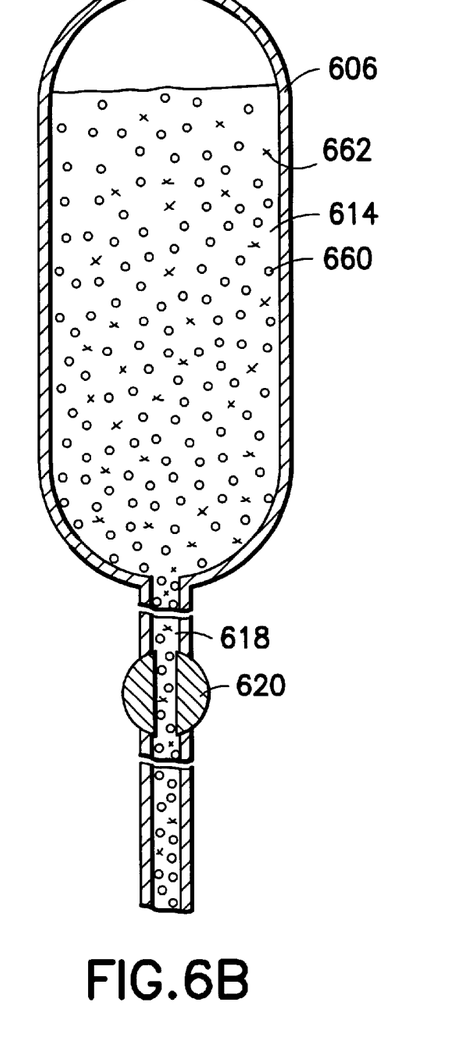

While the foregoing discussion pertains primarily to solid oxidizers retained in fluid oxidizers, it is understood that the mixed-phase suspension process of the present invention is equally applicable to fuel component materials. In this regard, FIGS. 6A and 6B show a fuel chamber 606, in a static state, that contains a solid-phase particulate fuel component 660 (e.g., aluminum powder) and a liquid fuel component 614 (e.g., liquid ethane) retained under pressurized conditions, such as saturated (540 psig, 20° C.) or supercritical (750 psia, 50° C.) conditions. The fuel chamber 606 is connected to a combustion chamber (not shown in FIGS. 6A and 6B) via a communicating passage 618 containing conventional gas valving 620.

In operation, the mixed-phase suspension 4.R process is achieved by opening the valve 618, which depressurizes the fuel storage chamber 606. This expands gas 662 present in the chamber 606, thereby forcing the gas 662 into interstices within the particulates 660, whereby the solid-phase fuel particulates 660 become suspended and distributed in the liquid fuel component 614. The mixed-phase fuel is transferred into the combustion chamber, where a reaction proceeds upon contact between the oxidizer. The oxidizer can be supplied in a fluid or mixed-phase as part of a bipropellant propulsion system, or be integrated in the combustion chamber as part of a reverse hybrid fuel propulsion system.

Figure 7A:
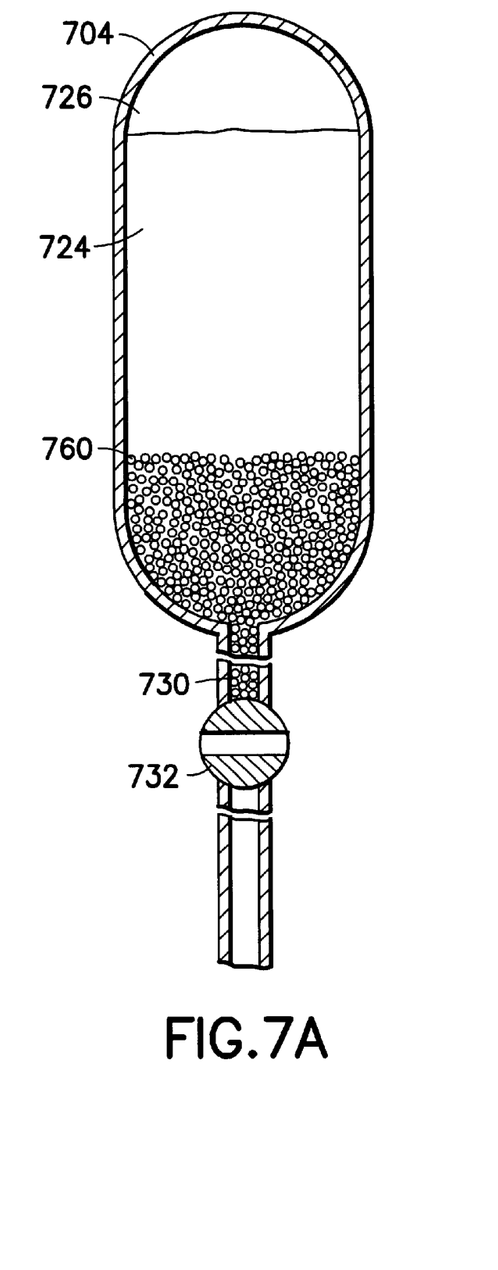
FIGS. 7A and 7B show schematic sectional views of a storage chamber containing a solid-phase particulate fuel and a saturated-fluid oxidizer under static conditions, and a mixed-phase oxidizer/particulate fuel mixture produced therefrom subsequent to at least partial depressurization of the chamber, respectively, which is adaptable for a monopropellant system in accordance with another embodiment of the present invention.
Figure 7B:
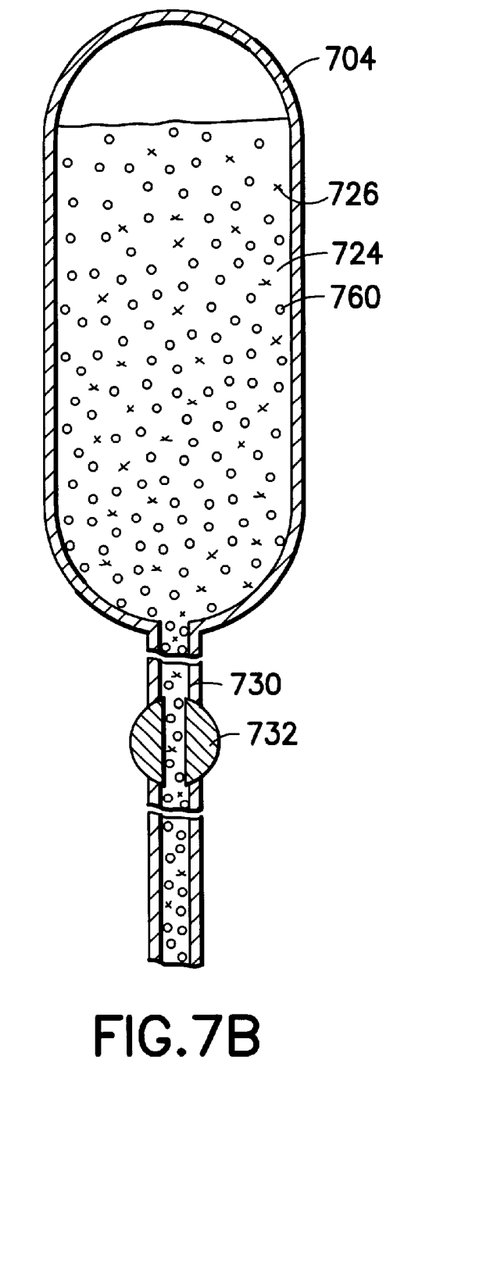

In addition, the mixed-phase suspension method can be utilized in a monopropellant, non-hybrid bipropellant, or hybrid bipropellant system including a storage chamber containing at least one solid-phase fuel component and at least one fluid oxidizer. For example, FIGS. 7A and 7B show a chamber 704, in a static state, containing a saturated liquid oxidizer 724, such as nitrous oxide, a vapor 726, and a solid particulate fuel component 760, such as boron powder under saturation conditions at 700 psig and 18° C. As shown in FIG. 7B, the solid particulate fuel component 760 becomes mixed with and suspended in the liquid oxidizer 724 due to the opening of the valving 732 located in communicating passage 730, which depressurizes and expands vapor 726 through the chamber 704. It is understood that a compressed vapor or an oxidizer fluid under critical or supercritical conditions can be substituted as an alternative to saturated liquid oxidizer 724. It is further understood that the chamber 704 can also include at least one solid-phase oxidizer. Alternatively, a solid-phase oxidizer, such as ammonium nitrate, can be dispersed in a fluid fuel, such as ethane, under saturated (540 psig, 20° C.) or supercritical (750 psia, 50° C.) conditions. Also, a solid-phase oxidizer, such as ammonium nitrate, can be dispersed in a fluid fuel, such as kerosene.

Suitable solid particulate fuel components 760 for the fluid-oxidizer/solid-particulate-fuel system described above include energetic propellant additives such as a double-base propellant (nitrocellulose-nitroglycerine) or an explosive/propellant such as research and development explosive (RDX) cyclotrimethylene-trinitramine or Her Majesty's Explosive (HMX) cyclotetramethylenetetranitramine. For example, utilizing a mixture of 20% by volume of nitrous oxide with 80% by volume of RDX particulate additive in the storage chamber in a hybrid rocket engine with HTPB fuel provides a theoretical specific impulse of about 266 seconds and a theoretical density specific impulse of about 376 sec·g/cc.

A rocket engine equipped with this system would have the following characteristics: possess the throttleability characteristics of a hybrid rocket engine insofar as the thrust can be controlled by controlling the flow of reactants into the combustion or reaction chamber with a variable valve or other regulating device; use low-toxicity propellants; exhibit a specific impulse comparable with a standard nitrous-oxide/HTPB engine; and exhibit a greatly increased density specific impulse in comparison to a standard composite solid-fuel rocket motor having an ammonium perchlorate oxidizer and HTPB fuel, which would provide a theoretical density specific impulse of about 388 sec·g/cc. Even employing only 20% by volume of RDX in nitrous oxide in the storage chamber provides a theoretical density specific impulse of about 225 sec·g/cc, a substantial improvement over nitrous-oxide/HTPB engines.

Combining the energetic propellant additive with the fluid oxidizer in a hybrid fuel rocket propulsion system enables the thrust of the rocket motor to be throttled by controlling the flow of the fluid oxidizer/solid fuel mixture into a combustion chamber containing additional solid-phase fuel. By contrast, the approach of integrating the energetic propellant additive in the solid fuel contained inside the hybrid rocket combustion chamber can induce an unstable situation if the solid fuel mixture within the combustion chamber becomes self-sustaining (that is, continues to react even in the absence of the fluid oxidizer from the storage chamber). Consequently, the ability to control the power of the motor by throttling the flow of the fluid oxidizer being supplied to the combustion chamber can be suppressed. Further, the long-term storage stability of the solid fuel component in the combustion chamber can be adversely affected by incorporating the energetic propellant additive into the solid fuel.

In addition to the approach of integrating the energetic propellant into the fluid oxidizer, elemental fuel additives such as, by way of example, aluminum, magnesium, lithium, or boron powders can be added to certain stable oxidizers, especially oxidizers that can require a high energy of activation to initiate a reaction with the particulate fuel, such as nitrous oxide or tetrafluoromethane. Other energetic additives include glycidyl azide polymer (GAP), ammonium dinitramine (ADN), and xenon hexafluoride. The addition of such additives can be advantageous in raising the specific impulse and density specific impulse of a storable rocket motor system while retaining the controllability (via throttling) over the rocket propulsion system. The additives can be suspended and mixed in fluid oxidizer or fluid fuel component in accordance with the mixed-phase suspension process of the present invention.

In the propulsion system of the present invention, the depressurization of the storage chamber(s) is initiated when the propellant (oxidizer and/or fuel) begins to flow from the storage chamber to the combustion chamber. Thus, nearly instantaneously, the mixed-phase propellant begins to discharge from the storage tank and flow to the combustion chamber, and continues to flow until the storage chamber is exhausted or the flow is modified by adjustment of the valving.

The flow of oxidizer from the storage chamber to the combustion chamber can be accomplished by utilizing the self-pressurizing characteristics of a condensed-liquid oxidizer such as nitrous oxide. (That is, the saturation pressure of the condensed liquid oxidizer at normal temperatures is sufficiently high to force the mixed-phase oxidizer into an operating combustion chamber, if the chamber is properly designed). Alternatively, the oxidizer optionally can be pressurized by supplying a higher-pressure gas pressurant to the ullage space (unnumbered) through a separate gas supply (reference numeral 138 in FIG. 1A) during discharge of the oxidizer.

Figure 8:
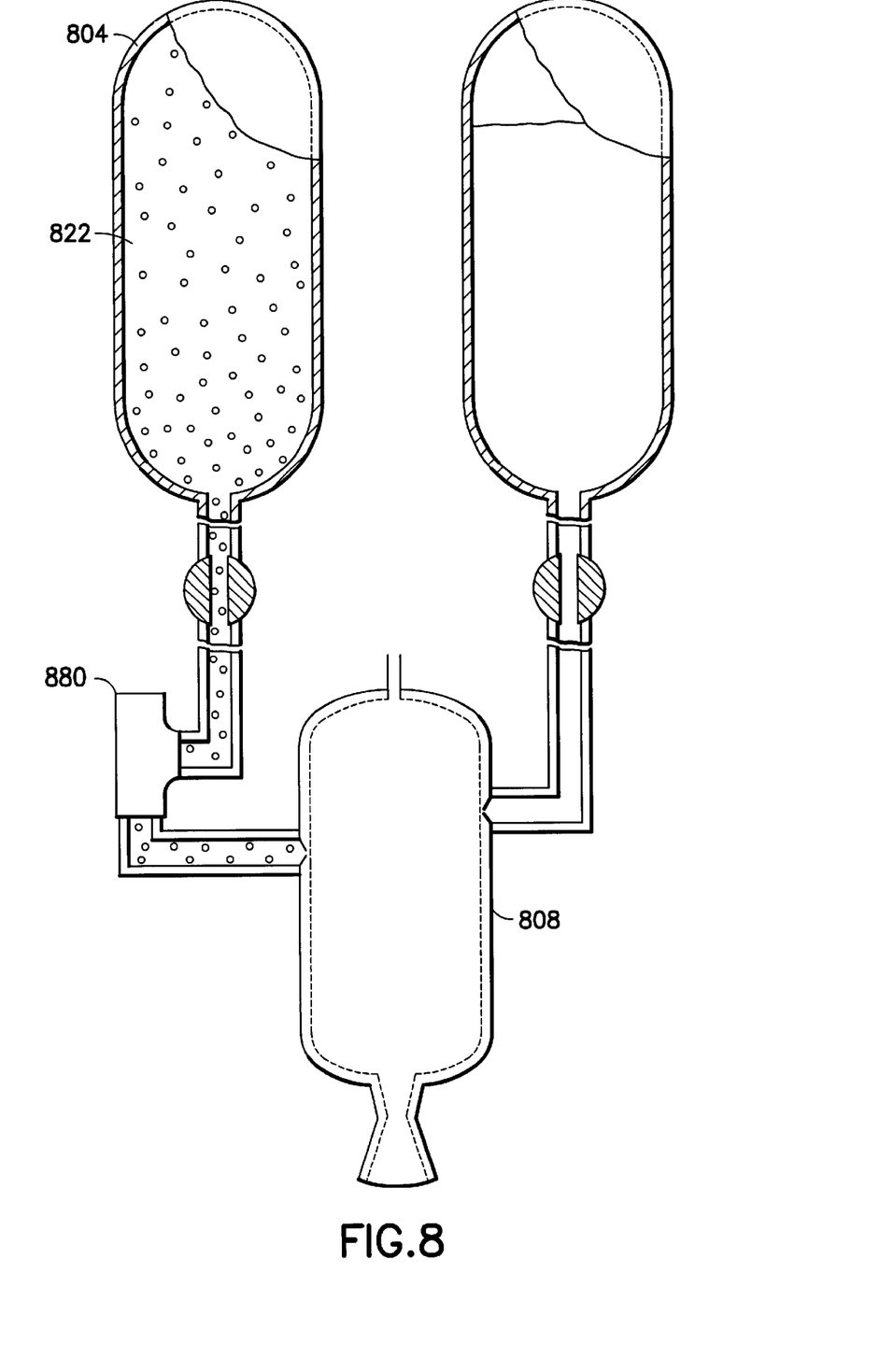
FIG. 8 illustrates a schematic view, including a partial cut away sectional view, of another alternative embodiment of the propulsion system of the present invention, in which a turbopump is used to increase the pressure of the mixed-phase propellant to the combustion chamber.

According to another variation of the embodiment shown in FIG. 1A, the oxidizer can be forced into the combustion chamber by a pumping means such as a turbopump. FIG. 8 displays a turbopump 880 employed to increase the feed pressure of the mixed-phase oxidizer 822 discharged from an opened storage chamber 804 to a combustion chamber 808. The turbopump 880 allows the combustion chamber 808 to be operated at a pressure higher than the oxidizer storage chamber pressure, so that a higher system efficiency can be achieved. Also, because the turbopump 880 allows the oxidizer storage chamber 804 to be maintained at a lower pressure, the strength (and weight) requirements of the chamber 804 are reduced.

The turbopump 880 can include a power-producing turbine coupled to a compressor turbine which imparts energy to and increases the pressure of the oxidizer. The power-producing turbine portion of the turbopump can be powered by gas produced in a separate reaction chamber by a compressed gas, or by another source of pressurized gas as is known in the art.

The provision of a turbopump 880 can be particularly useful for saturated-liquid oxidizer systems, in which the storage tank preferably is operated at a saturation pressure based on ambient temperature and the characteristics of the liquid oxidizer phase, while the combustion chamber 808 is preferentially operated at a much higher pressure. It is understood that the turbopump 880 can be integrated with any of the systems and storage chamber configurations described herein.

While the foregoing discussion generally pertains to oxidizers adaptable for use in hybrid-fueled or liquid-fueled rocket motors, the same mixed-phase suspension process can be applied to the fuel component of a liquid-fueled rocket motor or "reverse hybrid" rocket motor, in which a fluid fuel is introduced into a combustion chamber containing a solid oxidizer.

Figure 9:
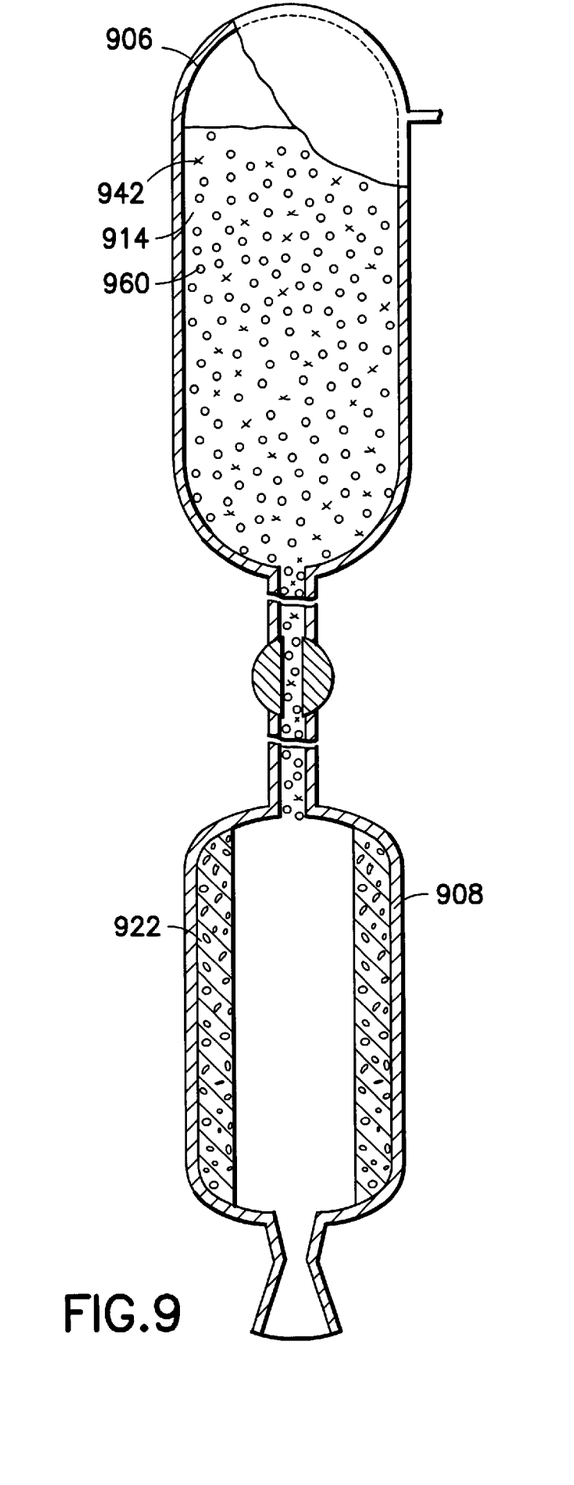
FIG. 9 shows a schematic view, including a partial cut away sectional view, of an alternative embodiment of a reverse-hybrid fuel propulsion system according to an embodiment of the present invention, in which a solid-phase oxidizer propellant is retained in the combustion chamber.

FIG. 9 shows a "reverse-hybrid" rocket propulsion system in which a fuel storage chamber 906 containing a particulate solid-phase fuel component 960 (such as boron) and a fluid fuel 914 (such as ethane) retained at saturation pressure in a static state. Upon opening of valve 920, the liquid fuel 914 in chamber 906 boils to form gas bubbles 942, and gas 942 expands into interstices between the particulates 960, creating a solid-liquid-gas fuel mixture that discharges into a combustion chamber 908. In a reverse-hybrid system, the combustion chamber 908 contains a solid oxidizer 922, such as ammonium perchlorate or nitronium perchlorate. The solid oxidizer structure 922 inside the combustion chamber 908 usually requires a mechanical support or matrix such as reticulated foamed aluminum structure (not shown).

Suitable solid fuel components for the reverse-hybrid fuel propulsion system include metal powders (e.g., aluminum, magnesium, lithium, boron, or any combination thereof), and energetic propellant materials (e.g., 3,3-Bis (azidomethyl)oxetane (BAMO), RDX or double-base propellants), which raise the density of the fuel and consequently reduce the aerodynamic drag due to the tank structure. These solid fuel components are equally advantageous in liquid-fueled rocket motors, in which the oxidizer can be conventional (e.g., nitrogen tetroxide or liquid oxygen) or mixed-phase.

It is understood that each of the foregoing embodiments and examples are interrelated, and components of these embodiments can be combined and interchanged in accordance with the understanding and skill level of a person skilled in the art.

Although the present invention has been described in detail with reference to its presently preferred embodiments, it will be understood by those of ordinary skill in the art that various modifications and improvements to the present invention are believed to be apparent to one skilled in the art. All such modifications and improvements are intended to be included within the scope of the appended following claims.

What is claimed is:

1. A propulsion system, comprising:
   a first chamber containing at least one solid oxidizer and at least one fluid oxidizer retained under pressurized conditions;
   a combustion chamber; and
   a communicating passage interconnecting said combustion chamber and said first chamber,
      wherein depressurization of said first chamber substantially homogeneously disperses said at least one solid oxidizer in said at least one fluid oxidizer to provide a dispersed mixture and
      said combustion chamber is adapted to receive at least one fuel component together with said dispersed mixture and provide for the combustion of said at least one fuel component and said dispersed mixture.

2. A system according to claim 1, wherein said pressurized conditions include said at least one fluid oxidizer being retained under supercritical temperature, supercritical pressure, or supercritical temperature and pressure.

3. A system according to claim 1, wherein said at least one fluid oxidizer includes a gas and further wherein said pressurized conditions include said gas being retained under compressed conditions.

4. A system according to claim 1, wherein said pressurized conditions include said at least one fluid oxidizer being retained under saturated conditions.

5. A system according to claim 1, further comprising a second chamber adaptable to store said at least one fuel component, said second chamber being in communication with said combustion chamber.

6. A system according to claim 1, wherein said system is a hybrid rocket propulsion system, and wherein said at least one fuel component is stored in said combustion chamber.

7. A system according to claim 1, further comprising a standpipe having a plurality of exit ports constructed and arranged to maintain a proportion of said at least one fluid oxidizer to said at least one solid oxidizer in a flow stream discharged from said first chamber substantially constant during at least a substantial portion of discharge.

8. A system according to claim 1, further comprising a turbopump for feeding said at least one fluid oxidizer and said at least one solid oxidizer to said combustion chamber.

9. A system according to claim 1,
   wherein said at least one solid oxidizer is at least one of ammonium nitrate, nitronium perchlorate, and ammonium dinitramide.

10. A propulsion system, comprising:
    a first chamber containing at least one solid fuel component and at least one fluid oxidizer retained under pressurized conditions;
    a combustion chamber; and
    a communicating passage interconnecting said combustion chamber and said first chamber,
       wherein depressurization of said first chamber substantially homogeneously disperses said at least one solid fuel component in said at least one fluid oxidizer to provide a dispersed mixture and
       said combustion chamber is adapted to receive and combust at least said dispersed mixture.

11. A system according to claim 10, wherein said at least one solid fuel component comprises discrete solid fuel particulates.

12. A system according to claim 11, wherein said pressurized conditions include said at least one fluid oxidizer being retained under supercritical temperature, supercritical pressure, or supercritical temperature and pressure.

13. A system according to claim 11, wherein said at least one fluid oxidizer includes a gas and further wherein said pressurized conditions include said gas being retained under compressed conditions.

14. A system according to claim 11, wherein said pressurized conditions include said at least one fluid oxidizer being retained under saturated conditions.

15. A system according to claim 11, further comprising a standpipe having a plurality of exit ports constructed and arranged to maintain a proportion of said at least one fluid oxidizer to said solid fuel particulates in a flow stream discharged from said first chamber substantially constant during at least a substantial portion of discharge.

16. A system according to claim 11, wherein said system is a monopropellant rocket propulsion system.

17. A system according to claim 11,
wherein said at least one solid fuel component is at least one of aluminum, magnesium, lithium, boron, 3,3-Bis (azidomethyl)oxetene, RDX, nitrocellulose-nitroglycerine, and HMX.

18. A propulsion system, comprising:
a first chamber containing at least one solid component and at least one fluid component retained under pressurized conditions;
a combustion chamber; and
a communicating passage interconnecting said combustion chamber and said first chamber,
wherein depressurization of said first chamber substantially homogeneously disperses said at least one solid fuel component in said at least one fluid component to provide a dispersed mixture and
said combustion chamber is adapted to receive at least said dispersed mixture and provide for the combustion of at least said dispersed mixture.

19. A system according to claim 18, wherein said at least one solid component comprises solid oxidizer particulates or solid fuel particulates, and further wherein said at least one fluid component comprises a fluid fuel.

20. A system according to claim 19, wherein said pressurized conditions include said at least one fluid fuel being retained under supercritical temperature, supercritical pressure, or supercritical temperature and pressure.

21. A system according to claim 19, wherein said at least one fluid fuel includes a gas and further wherein said pressurized conditions include said gas being retained under compressed conditions.

22. A system according to claim 19, wherein said pressurized conditions include said at least one fluid fuel being retained under saturated conditions.

23. A system according to claim 19,
wherein said solid component comprises solid oxidizer particulates, and said system further comprises,
a standpipe having a plurality of exit ports constructed and arranged to maintain a proportion of said at least one fluid fuel to said solid oxidizer particulates in a flow stream discharged from said first chamber substantially constant during at least a substantial portion of discharge.

24. A system according to claim 19, wherein said system is a reverse-hybrid rocket propulsion system.

25. A process for mixing separate at least one fluid-phase propellant and at least one solid-phase propellant in a chamber, comprising the steps of:
retaining the at least one fluid-phase propellant and at least one solid-phase propellant under pressurized conditions in a chamber; and
depressurizing the chamber to thereby substantially homogeneously disperse the at least one solid-phase propellant in said at least one fluid-phase propellant.

26. A process according to claim 25, wherein said pressurized conditions include said at least one fluid-phase propellant being retained under supercritical temperature, supercritical pressure, or supercritical temperature and pressure.

27. A process according to claim 25, wherein said at least one fluid-phase propellant includes a gas and further wherein said pressurized conditions include said gas being retained under compressed conditions.

28. A process according to claim 25, wherein said pressurized conditions include said at least one fluid-phase propellant being retained under saturated conditions.

* * * * *